J. LICHTL.
LATHE FOR PRODUCING TURNED, SPUN, OR CHASED ARTICLES OF REGULAR OR IRREGULAR FORM.
APPLICATION FILED AUG. 14, 1909.

988,118.

Patented Mar. 28, 1911.

2 SHEETS—SHEET 1.

J. LICHTL.
LATHE FOR PRODUCING TURNED, SPUN, OR CHASED ARTICLES OF REGULAR OR IRREGULAR FORM.
APPLICATION FILED AUG. 14, 1909.
988,118.
Patented Mar. 28, 1911.
2 SHEETS—SHEET 2.
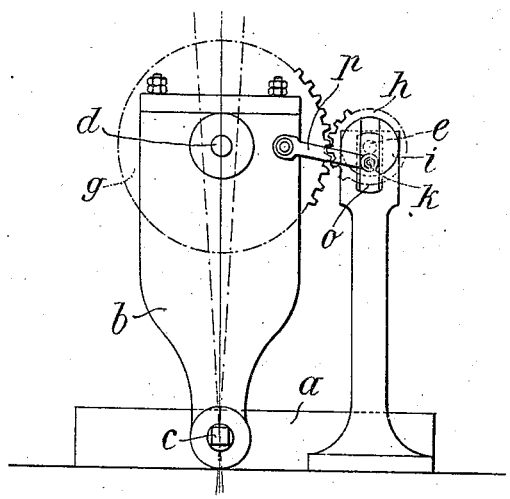
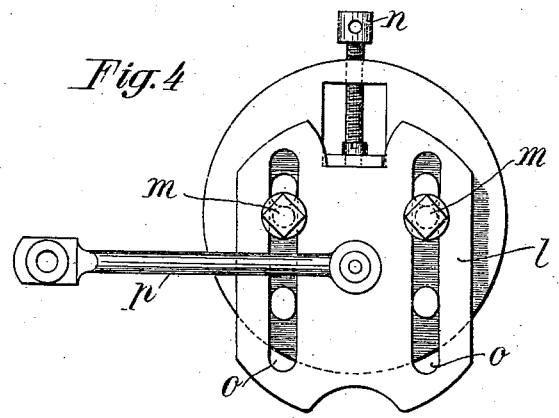
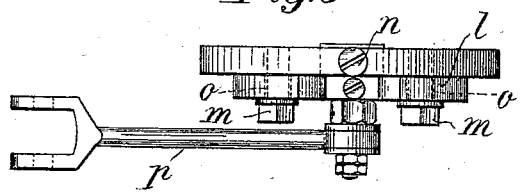

UNITED STATES PATENT OFFICE.

JOHANN LICHTL, OF VIENNA, AUSTRIA-HUNGARY.

LATHE FOR PRODUCING TURNED, SPUN, OR CHASED ARTICLES OF REGULAR OR IRREGULAR FORM.

988,118. Specification of Letters Patent. Patented Mar. 28, 1911.

Application filed August 14, 1909. Serial No. 512,797.

*To all whom it may concern:*

Be it known that I, JOHANN LICHTL, master turner, a subject of the Emperor of Austria - Hungary, and a resident of Seidengasse 4, Vienna, VII, in the Empire of Austria-Hungary, have invented a new and useful Lathe for Producing Turned, Spun, or Chased Articles of Regular or Irregular Forms; and I do hereby declare the following to be a full, clear, and exact description of the invention, such as will enable others skilled in the art to which it appertains to make and use the same.

My invention relates to improvements in lathes in which the headstock carrying the work is oscillated by a crank and connecting rod from a secondary shaft. This second shaft is driven from a primary shaft.

Now, according to my invention the headstock is oscillated through a secondary shaft actuated by the mandrel, which is driven direct from the source of power. The secondary shaft advantageously consists of two parts connected by a universal joint, the rear part being held in an oscillating bearing and the front part carrying a disk having a pin eccentrically adjustable thereon and actuating a connecting rod which transmits its motion to the headstock.

Figure 1:
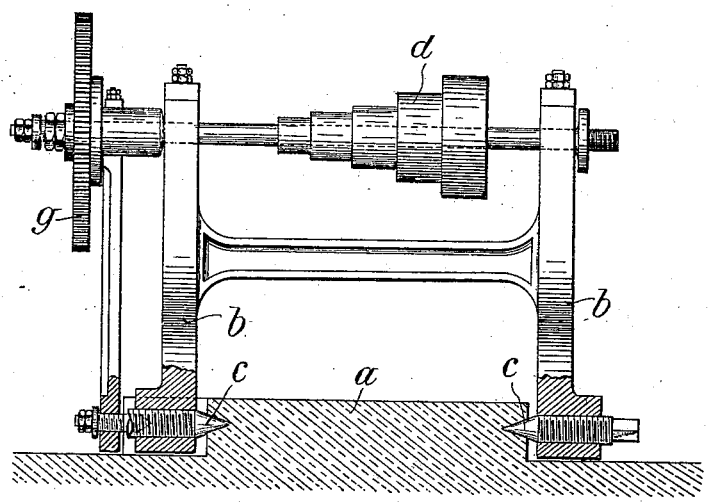
Figure 2:
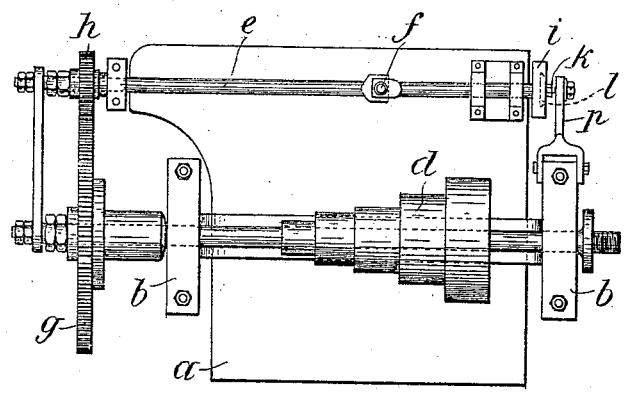

In the accompanying drawing:—Figure 1 is a sectional side view of a headstock constructed according to the invention. Fig. 2 is a plan view thereof. Fig. 3 is an end view of the same. Figs. 4 and 5 are views of a detail hereinafter described, and Fig. 6 represents the section of an article such as may be produced on the lathe, and the form of which will depend on the speed of the secondary shaft and the number of oscillations of the headstock.

$a$ is the bed of the lathe and $b$ the headstock, the said headstock $b$ being mounted on the bed $a$ between the centers $c, c$.

$d$ is the stepped driving pulley of the headstock, the spindle of which pulley has arranged parallel to it the secondary shaft $e$ which is formed in two parts connected together by a universal joint so that the rear part thereof is movable relatively to the front part.

The main and secondary shafts are connected by toothed gearing or by belting which runs over suitably sized exchangeable pulleys. In the drawing toothed wheels $g$, $h$ are shown. The sizes of these wheels will depend on the form of article required; thus, if for example, the mandrel makes one revolution the secondary shaft should be arranged to make, say four or six revolutions.

The universal joint $f$ transmits the rotary motion of the rear part of the secondary shaft to the front part of the said shaft, which terminates in a disk $i$ having an eccentrically adjustable crank-pin $k$. The eccentricity depends on the depths of the curves required on the work. The connecting rod $p$ connects the crank-pin with the front part of the headstock and causes the latter to oscillate on the center $c$. The article on the headstock also takes part in these oscillations while rotating and has thereby imparted to it a wave-like or similar profile or periphery.

The disk $i$ is advantageously constructed as shown in Figs. 4 and 5, that is to say it carries a plate $l$ provided with longitudinal slots $o$ to receive the bolts $m$ for securing it in position. The crank-pin is secured to the said plate, and may be moved eccentrically by the screw $n$ which engages with a cheek on the plate $l$. If desired the adjustment may be effected to a scale provided for the purpose.

What I claim as my invention and desire to secure by Letters Patent is:

The combination, in a lathe of an oscillating headstock with a secondary shaft, formed in two parts and connected by a universal joint, a primary shaft connected to one part of the secondary shaft by exchangeable pulleys or gearing wheels, and an eccentrically adjustable crank-pin on the other part of said secondary shaft connected with the front part of the headstock by a connecting rod, substantially as set forth.

In testimony whereof I have signed my name to this specification in the presence of two subscribing witnesses.

JOHANN LICHTL.

Witnesses:
FRANZ REITER,
AUGUST FUGGER.

Copies of this patent may be obtained for five cents each, by addressing the "Commissioner of Patents, Washington, D. C."